United States Patent
Song et al.

(10) Patent No.: US 9,094,580 B2
(45) Date of Patent: Jul. 28, 2015

(54) VENDOR AND SCANNER INDEPENDENT COMMON WORKSTATION FOR SECURITY

(75) Inventors: Samuel M. Song, Las Vegas, NV (US); Brian Kauke, Las Vegas, NV (US); Douglas P. Boyd, Las Vegas, NV (US)

(73) Assignee: TELESECURITY SCIENCES, INC., Las Vegas, NV (US)

( * ) Notice: Subject to any disclaimer, the term of this patent is extended or adjusted under 35 U.S.C. 154(b) by 648 days.

(21) Appl. No.: 13/372,916

(22) Filed: Feb. 14, 2012

(65) Prior Publication Data
US 2012/0229631 A1 Sep. 13, 2012

Related U.S. Application Data

(60) Provisional application No. 61/442,696, filed on Feb. 14, 2011.

(51) Int. Cl.
*H04N 9/47* (2006.01)
*H04N 7/18* (2006.01)
*G08B 13/196* (2006.01)

(52) U.S. Cl.
CPC .......... *H04N 7/18* (2013.01); *G08B 13/19608* (2013.01); *G08B 13/19663* (2013.01); *G08B 13/19656* (2013.01); *G08B 13/19693* (2013.01)

(58) Field of Classification Search
CPC .............. G08B 13/19663; G08B 13/19693; G08B 13/19608; G08B 13/19656
USPC ................ 348/143, 151–153, 159
See application file for complete search history.

(56) References Cited

U.S. PATENT DOCUMENTS

| 8,831,331 | B2 * | 9/2014 | Gudmundson et al. | 382/141 |
| 2005/0058242 | A1 * | 3/2005 | Peschmann | 378/57 |
| 2007/0103313 | A1 * | 5/2007 | Washington | 340/572.8 |

* cited by examiner

*Primary Examiner* — Helen Shibru
(74) *Attorney, Agent, or Firm* — Procopio, Cory, Hargreaves & Savitch LLP

(57) ABSTRACT

Integrating a plurality of security imaging units for an airport security checkpoint into networked common workstations, including: scanning items with a first security imaging unit at a primary inspection area, wherein the first security imaging unit is coupled to a first networked common workstation; displaying the scanned items as a displayed image on a display of the first networked common workstation located at the primary inspection area; re-scanning the items with a second security imaging unit coupled to the first networked common workstation when a possible concealment is observed, wherein the first networked common workstation includes a conversion unit which converts outputs of the first and second security imaging units into a common format for the displayed image; routing the displayed image to a second networked common workstation located at a secondary inspection area when the possible concealment is observed, wherein the secondary inspection area is remote from the primary inspection area.

18 Claims, 4 Drawing Sheets

VENDOR AND SCANNER INDEPENDENT COMMON WORKSTATION FOR SECURITY

CROSS-REFERENCE TO RELATED APPLICATIONS

This application claims the benefit of priority of U.S. Provisional Patent Application No. 61/442,696, filed Feb. 14, 2011, entitled "Vendor and Scanner Independent Common Workstation (CW) for Security." The disclosure of the above-referenced provisional application is incorporated herein by reference.

BACKGROUND

1. Field of the Invention

The present invention relates to workstations, and more specifically, to vendor and scanner-independent common workstation for security.

2. Background

Security imaging systems are designed to detect and anomalies. At airport security checkpoints, the image of a scanned bag is presented on the scanner console for viewing by a Transportation Security Officer (TSO). The TSO makes the judgment based on the presented image, utilizing prior knowledge on appearances of various threats and anomalies. Currently, all carry-on scanners, including single view TRX (TIP-Ready X-ray) and multi-view AT (Advanced Technology) scanners, operate as stand-alone systems and each scanner requires at least one dedicated TSO to perform the inspection.

SUMMARY

The present invention provides for vendor and scanner independent common workstation for security.

Other features and advantages of the present invention will become more readily apparent to those of ordinary skill in the art after reviewing the following detailed description and accompanying drawings.

DETAILED DESCRIPTION

Figure 1:
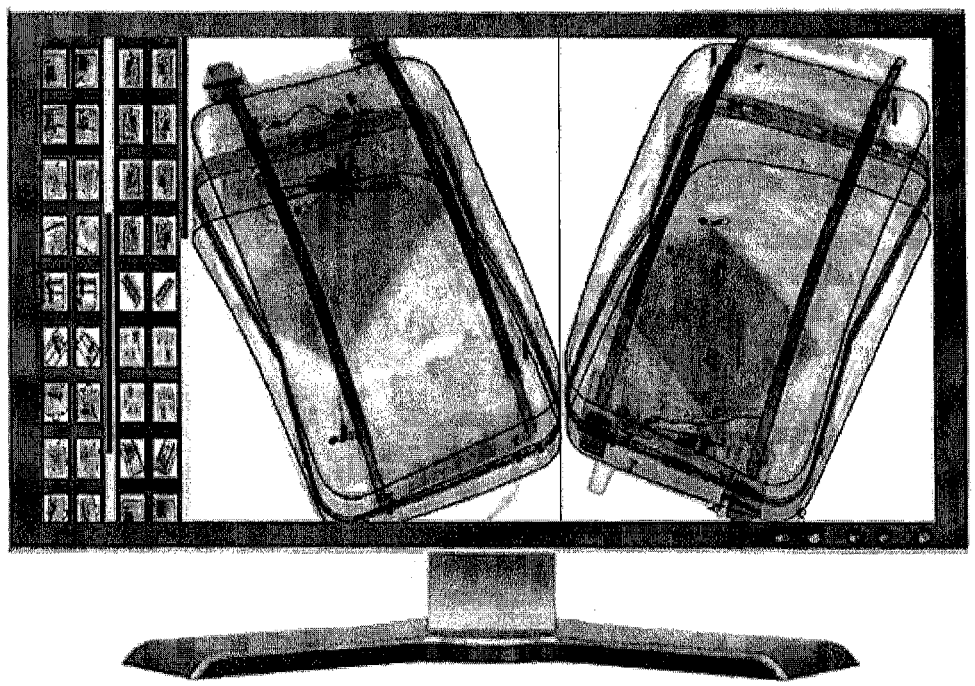
FIG. 1 shows the proposed CW GUI with two filmstrips indicative of the two respective scanners networked to this CW.

Certain implementations as disclosed herein provide for vendor and scanner-independent common workstation for security. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, the Common Workstation (CW) framework can be developed to integrate all imaging systems for airport security checkpoints, which can process and display the image data from all appropriate security systems. However, there are several problems with current systems. At airport security checkpoints, the image of a scanned bag is presented on the scanner console for viewing by a Transportation Security Officer (TSO). The TSO makes the judgment based on the presented image, utilizing prior knowledge on appearances of various threats and anomalies. Currently, all carry-on scanners, including single view TRX (TIP-Ready X-ray) and multi-view AT (Advanced Technology) scanners, operate as stand-alone systems and each scanner requires at least one dedicated TSO to perform the inspection.

These security scanners suffer from the following:

No Remote Inspection: Lack of standard networking protocols and vendor-proprietary image file formats prohibit communication among scanners and the outside world. As a result, it is difficult to network the scanners (especially a mix of scanners from different vendors) for remote inspection of images (or monitor/maintenance of scanners). It is even doubtful that scanners from the same vendor could be networked.

No Utilization of $3^{rd}$ Party Algorithms: Newly developed innovative algorithms by 3rd parties, such as Automated Target Recognition (ATR) and novel limited angle reconstruction algorithms, are not utilized. The scanner vendors are reluctant to accept $3^{rd}$ party algorithms developed elsewhere due to internal politics.

Inconsistent Display: Two different scanners of the same type, e.g., two AT scanners, will generate visually different images for one identical bag, due to vendor-dependent color image generation scheme. This can cause confusion and degrade TSO performance.

In one implementation, solutions for these problems including the above-listed problems provide benefits as noted below:

Remote Inspection (Scanner and Vendor Independent): The CW will connect to all scanners that are DICOS (Digital Image Communication for Security) compliant. Currently, no security scanners are DICOS compliant, and in the interim, the use of our internally developed software will allow seamless connection to several different systems, including TRX, AT and AIT (Advanced Imaging Technology) scanners, enabling remote inspection and monitoring. Our current prototype CW already handles certain vendor's TRX, AT and AIT images. Note that all scanners connected to the proposed CW immediately become DICOs compliant as CW communicates to the outside world on behalf of the scanners.

Utilization of 3rd Party Algorithms: The CW will accept any 3rd party software such as ATR without affecting the scanner operation. Such ATRs may alleviate the need for TSOs one day. As new innovations are discovered and implemented, the new algorithms can become a part of the CW as a plug-in. Recent innovations such as iterative image reconstruction algorithms with limited number of views and optimum scanner dependent processing can quickly be integrated into the proposed CW for independent TSA testing.

Consistent Display: The image of an identical bag will always look the same (independent of the scanner) because the proposed CW will utilize identical color image generation scheme for all AT scanners.

Multipurpose Workstation: The CW framework allows the workstation to be used for different purposes to expedite the screening process and thus to reduce cost. The CW may be placed next to the scanner for the usual Primary Inspection. Eventually, all AT consoles could be replaced by the proposed CW. The CW may be placed at the Secondary Inspection Area (perhaps 10-20 ft. away from the scanner) where a second TSO can take a second look at the image at the request of the first TSO. The CW may be placed at the Bag Search Area to provide visual cues (location) to quickly find certain concealments while searching inside the bag.

Quick Incorporation of New Technologies: Currently installed scanners may not need to be upgraded, if incorporation of new innovative algorithms as plug-ins suffices. For instance, $3^{rd}$ party software could readily be integrated into the proposed CW. In addition, the CW can quickly take advantage of recent advances in computing power such as multi-core CPUs and NVidia's GPU (Graphics Processing Unit) technology.

Lower TSO Training Cost: Once a TSO is trained on the proposed CW, the TSO will not need additional training to inspect security images, so long as the inspection is performed on the proposed CW, whether it is connected to TRX, AT or even AIT.

Expedited Independent TSA Testing of Scanners: Use of the proposed CW allows TSA to independently test various security scanners as well all associated $3^{rd}$ party software plug-ins for image quality and performance.

In one implementation, the development of CW can follow this set of tasks:

Networking Component: All scanners are networked by virtue of a connection to a CW through a suitable network protocol (including certain security measures) to be developed.

Universal Image Format: Software for handling different image formats from different scanners will be developed. Currently, the internally developed TSS software library handles Rapiscan, Astrophysics, and L-3 image formats. The list will be expanded as necessary.

Image Browsing: An intuitive multi-touch interface for image browsing and manipulation will be developed. This component allows the CW to function as a local as well as remote TSO inspection workstation.

Remote Inspection: The CW allows TSOs to browse the images on any networked scanner from any location anywhere in the world.

Extensible Software Architecture: The extensible software architecture allows quick integration of newly developed $3^{rd}$ party algorithms as plug-ins. The architecture allows ATRs to be quickly upgraded to include newly found threats.

ATR (Automatic Target Recognition) Capability: The extensibility of the proposed CW will be demonstrated by integrating our own ATR algorithms for AT. The ATR will detect materials that human inspectors may not readily identify, e.g., liquid explosives or threats buried in the midst of cluttered background. Our current implementation of the ATR takes a few seconds on a conventional Pentium platform and will be made to execute within a second.

Note that the proposed CW framework allows 3.sup.rd parties to develop Threat Image Projection (TIP) as a CW plug-in. For instance, there may be an approach to develop a TIP library for a generic scanner that is applicable to all line scanners including TRXs and ATs. The 3.sup.rd party software would use this TIP library to insert threat images into the image data stream in real-time. The processing would require some transformations according to the specific scanner geometry data and the real-time image data to correctly place the TIP object in the midst of the bag in one (TRX) or more (AT) views.

In conclusion, the proposed CW framework allows seamless integration of 3.sup.rd party algorithms as plug-ins and this extensible framework provides an open pathway to harness the expertise of independent teams of scientists from government labs, universities, and industry.

Benefits of the proposed CW framework include: local and remote inspection with ATR for higher passenger throughput (streamlined screening) and lower false alarm rates (ATR aided inspection); simple Integration of $3^{rd}$ party software solutions (ATR, TIP, image reconstruction, etc.); immediate upgrading of all scanners to be DICOS compliant by virtue of a connection to a DICOS compliant CW; and interface to all security imaging systems including TRX, AT, AIT and EDS.

The above benefits are realized with the following components of CW as described below.

Universal Image Format—The scanned image data must be transported from the scanner to the CW over a secure network. Different methods may be used for different type of scanners and the CW framework provides a standardized access. Specifically, we investigate the following aspects.

Network infrastructure: either wired or wireless LAN will be deployed as relevant.

Communication security: employment of strong authentication and encryption methods using SSL/TLS (Secure Socket Layer/Transport Layer Security) and/or VPN (Virtual Private Network) technology.

Remote file system mounting: Rapiscan's MS Windows-based and Smiths Detection's Linux-based OS offer this capability.

API (Application Programming Interface): encapsulation of the details in a standard API set, which may be relevant for $3^{rd}$ party software developers.

The CW is designed to be DICOS compliant. However, until the emerging DICOS standard gains industry-wide acceptance, software for handling different image formats from different scanners will be developed. Currently, our internally developed TSS software library handles Rapiscan, Astrophysics, and L-3 image formats. The list will be expanded as necessary.

Image Browsing—The proposed CW is designed with multi-touch Graphical User Interface (GUI) with the usual multi-touch interaction. The touch-and-move pans the image and the two-finger-pinch zooms the image, similar to Apple's iPhone interface.

FIG. 1 shows the proposed CW GUI with two filmstrips indicative of the two respective scanners networked to this CW. Note that both two scanners are dual-view where each thumbnail consists of two sub-thumbnails (one per view). Touching a thumbnail on the filmstrip displays the image on the right corresponding to that thumbnail. Flicking the filmstrip advances the displayed image forward or backward depending on the direction of the flick.

Figure 2:
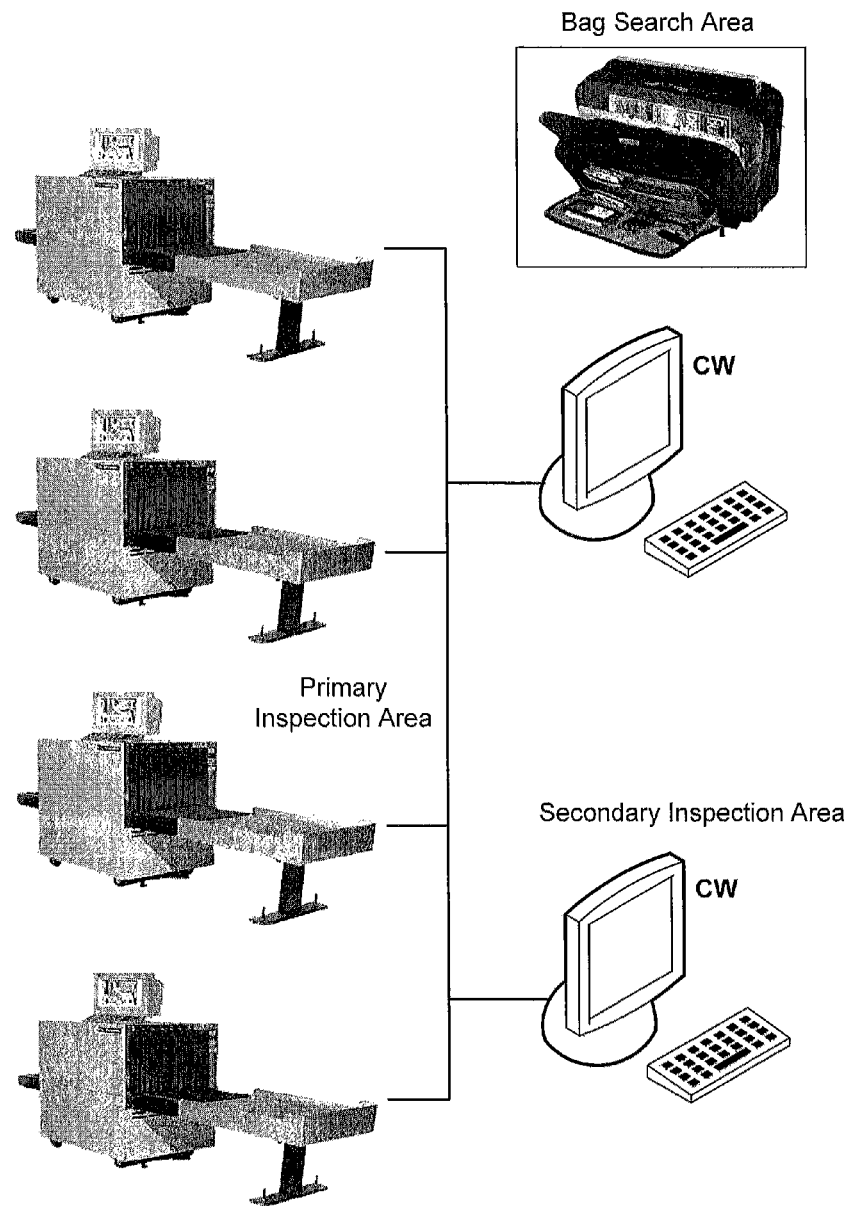
FIG. 2 illustrates the concept of remote access within a security checkpoint.

Remote Inspection—The concept of remote access within a security checkpoint is illustrated in FIG. 2. The two CWs are networked to the four scanners and are equipped to perform remote inspection.

Primary Inspection Area—The TSO at one of the scanners, upon observing a possible concealment, may either request (1) bag check, and route the image to the Secondary Inspection Area, or (2) bag search, and route the image to the Bag Search Area. The CWs located at these areas perform as follows.

Secondary Inspection Area—The CW supports the remote inspection performed by a second TSO (with more experience) perhaps located 10-20 ft. away from the scanner. The proposed CW framework alleviates the second TSO of the need to physically move to the scanner, which often times is known to cause bottlenecks during the inspection process. The second TSO may also request bag search.

Bag Search Area—The CW aids the bag opening by displaying the image of the scanned bag so that the TSO searching for the potential concealment can quickly find the object.

Figure 3:
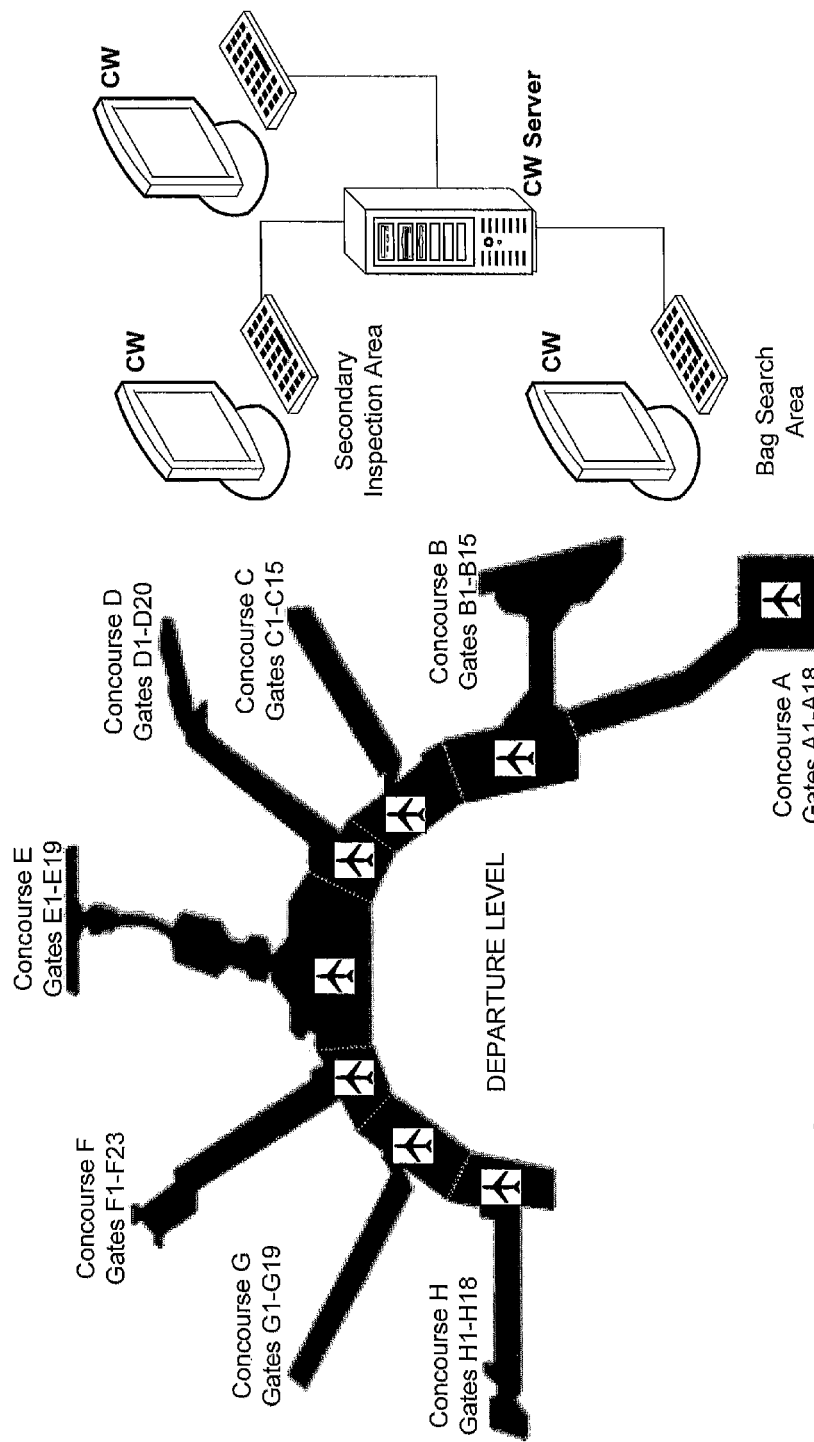
FIG. 3 shows that all CWs are connected to a CW Server and, through this server, a remote CW located anywhere in the world can access the same data as the local CW at the checkpoint.

The image sharing capability can be extended beyond a single airport checkpoint. All CWs are connected to a CW Server and, through this server, a remote CW located anywhere in the world can access the same data as the local CW at the checkpoint as shown in FIG. 3.

The CW Server manages all communication requests and has the capability to log all relevant data traffic between the local CW and the remote CW. Multiple remote CWs may even access the same data to execute different ATR algorithms in parallel.

Figure 4:
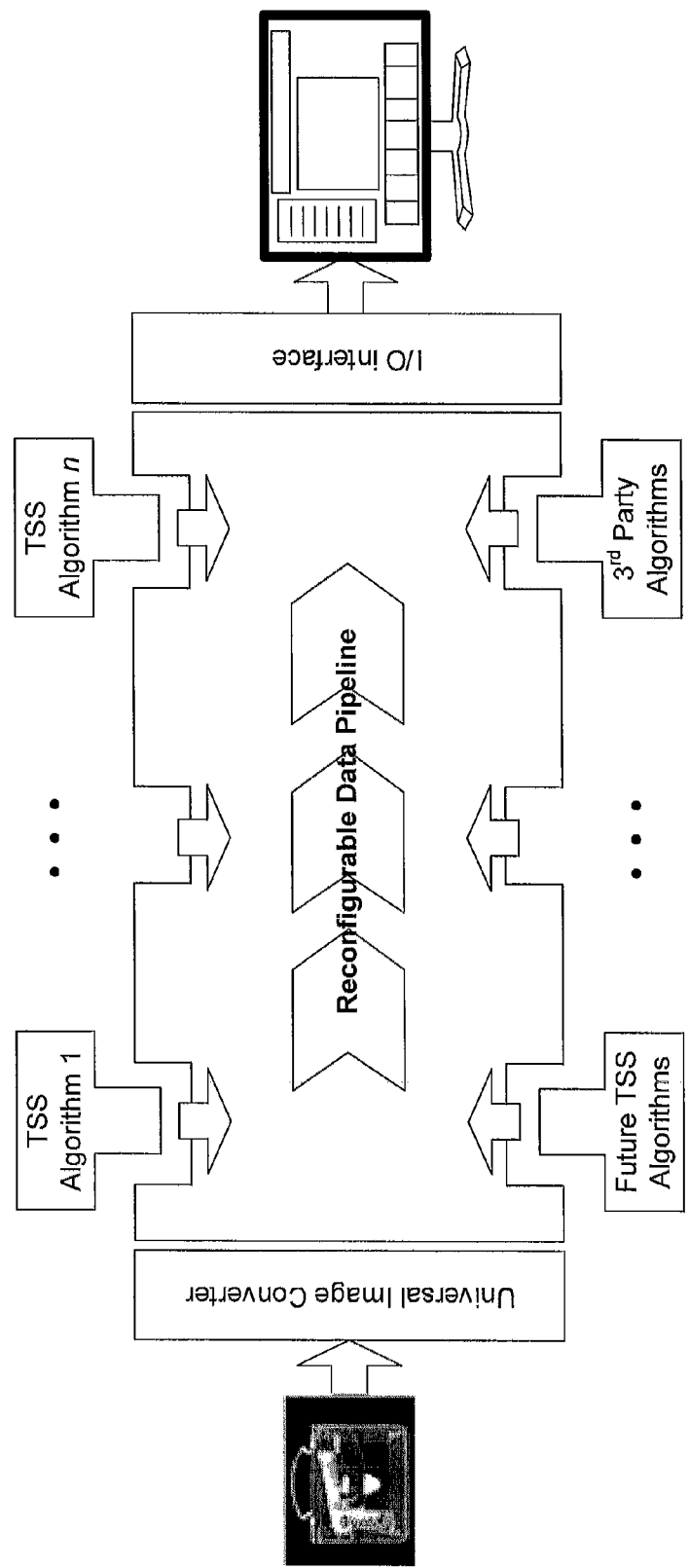
FIG. 4 shows this concept of extensible software architecture that accepts plug-in components.

Extensible Software Architecture—The extensible software architecture accommodates currently available software components and extends the capability by allowing future technologies to be easily integrated. This requires the framework that accepts the standard interface for plug-in components. FIG. 4 shows this concept of extensible software architecture that accepts plug-in components.

The CW will be based around a Reconfigurable Data Pipeline that must perform several essential tasks. First, it must configure and mediate the flow of data between its attached plug-ins. Modular plug-in architectures for similar purposes are common in modern software systems. Well-specified and widely used examples include COM, OSGi, and CORBA, although it is common to find custom plug-in architectures to address specific needs. TSS will work to specify a plug-in architecture that is convenient for ATR vendors to implement. When a plug-in is loaded, it will provide information to the CW about its expected inputs and outputs so that the CW can configure the data pipeline accordingly. Further, the CW must aggregate and integrate analysis information from various ATR plug-ins. Plug-ins may also need to remain appraised of the system state and operator input. A blackboard system or publish/subscribe messaging model will facilitate this communication while allowing the system to remain dynamic and extensible. The process isolation features provided by modern operating systems combined with fault-tolerant software engineering practices should enable the CW to handle the failure of any plug-in component without interrupting the flow of commerce.

In this architecture, the input image data is processed by the reconfigurable data pipeline. All the installed software components process the image data sequentially, and deliver the result to the I/O Interface. This framework allows future software components to be plugged-in, whether developed by TSS or by a 3$^{rd}$ party developer.

ATR (Automatic Target Recognition) Capability—The functionality of the extensible software architecture will be demonstrated by integrating an ATR algorithm developed by TSS through the CW plug-in interface. The ATR will detect liquid and explosive concealments in bags. Furthermore, the ATR will attempt to identify and classify the detected concealments.

TSS has been developing ATR algorithms applicable to various security imaging systems and in the process we have developed various image processing and analysis algorithms. The immediately applicable software components for the proposed ATR include: Image segmentation analysis library; Object reconstruction by discrete tomography; and Liquid and explosive detection and classification.

The above will conform to the plug-in interface of the extensible software architecture of the proposed CW framework.

Networking Component: Image transport over the network is well supported in most modern platforms on which the scanner software is hosted. The communication security mechanisms are well established and the network environment may be either on wired or wireless network. In case of wireless, the data will be transported over a secure channel based on the WPA2 encryption standard. The network performance will not be an issue as a typical image, with a size of 1 Mbytes, would take less than ⅕ second for transfer even on a slow wireless network. In any case, the image transportation will be performed in the background to minimize the delay.

Universal Image Format: TSS has already developed image handling software for a limited number of vendor proprietary image file formats.

Image Browsing: TSS has developed a prototype image browser as shown in FIG. 1. Certain improvements are necessary and should be straightforward.

Remote Inspection: Portions of this task have been implemented and we do not foresee any complications.

Extensible Software Architecture: Software modularity and extensibility have been the key issue in software design since the beginning of software engineering field 40 years ago. It has come to maturity through many programming paradigms and tools including Object-Oriented Design (OOD) concepts and extensible software approaches (cf. Blackboard, Pipes and Filters, and FxEngine). No complications are expected for the plug-in interface of the CW framework.

ATR Capability: TSS ATR has shown outstanding performance in a recent government-sponsored study. The ATR for liquid threat detection for TRX scanners showed extraordinary performance (100% PD, 0% PFA) using dual-energy radiographic images that government provided to TSS. ATs are essentially TRXs in series and we have been upgrading the ATR capability to ATs aided by limited angle discrete tomography techniques.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method to integrate a plurality of x-ray security imaging units for an airport security checkpoint into networked common workstations, the method comprising:
   scanning items with a first x-ray security imaging unit at a primary inspection area, the first x-ray security imaging unit having a first image format,
   wherein the first x-ray security imaging unit is coupled to a first networked common workstation;
   displaying the scanned items as a displayed image on a display of the first networked common workstation located at the primary inspection area;
   re-scanning the items with a second x-ray security imaging unit coupled to the first networked common workstation when a possible concealment is observed, the second x-ray security imaging unit having a second image format, wherein the second image format is not necessarily the same as the first image format, wherein the first networked common workstation includes a conversion unit which converts outputs of the first and second x-ray security imaging units into a common format for the displayed image;

routing the displayed image to a second networked common workstation located at a secondary inspection area when the possible concealment is observed, wherein the secondary inspection area is remote from the primary inspection area.

2. The method of claim 1, wherein the display of the first networked common workstation located at the primary inspection area is configured with a multi-touch graphical user interface which allows annotations and markings to be made by a first inspector of the displayed image on the display of the first networked common workstation.

3. The method of claim 2, wherein the secondary inspection area is configured as a remote search area for further inspection of the items by a second inspector using the displayed image routed to a display of the second networked common workstation.

4. The method of claim 3, wherein the displayed image routed to the display of the second networked common workstation includes the annotations and markings of the first inspector at points of the possible concealment within the items.

5. The method of claim 1, further comprising
displaying the items re-scanned with the second x-ray security imaging unit as the displayed image on the display of the first networked common workstation.

6. The method of claim 1, further comprising
re-scanning the items with a third x-ray security imaging unit coupled to the second networked common workstation for further inspection at the secondary inspection area,
wherein a second inspector at the secondary inspection area makes annotations and markings for further analysis.

7. The method of claim 6, wherein the further analysis includes
aggregating, classifying, and storing images of the items re-scanned by the third x-ray security imaging unit using corresponding annotations and markings made by the second inspector,
wherein the stored images are formed as a threat image projection library.

8. The method of claim 7, further comprising
inserting the images of the threat image projection library into an image data stream of the airport security checkpoint to validate the plurality of x-ray security imaging units.

9. The method of claim 6, further comprising
communicating results of the further analysis of the items by the second inspector back to the first networked common workstation for a final determination by the first inspector.

10. The method of claim 1, wherein the common format for the displayed image is made compliant with Digital Image Communication for Security.

11. A system to integrate a plurality of x-ray security imaging units for an airport security checkpoint into networked common workstations, the system comprising:
a first x-ray security imaging unit coupled to a first networked common workstation, the first x-ray security imaging unit having a first image format and configured to scan items at a primary inspection area;
a first display coupled to the first networked common workstation, the first display to display the scanned items as a displayed image;
a second x-ray security imaging unit coupled to the first networked common workstation, the second x-ray security imaging unit configured to re-scan the items when a possible concealment is observed on the displayed image, the second x-ray security imaging unit having a second image format, wherein the second image format is not necessarily the same as the first image format;
a conversion unit coupled to the first networked common workstation configured to convert the outputs of the first and second x-ray security imaging units into a common format for the displayed image;
a router configured to route the displayed image to a second networked common workstation located at a secondary inspection area when the possible concealment is observed,
wherein the secondary inspection area is remote from the primary inspection area.

12. The system of claim 11, wherein the first display is configured with a multi-touch graphical user interface which allows annotations and markings to be made by a first inspector of the displayed image on the first display.

13. The system of claim 12, wherein the secondary inspection area is configured as a remote search area for further inspection of the items by a second inspector using the displayed image routed to a second display coupled to the second networked common workstation.

14. The system of claim 13, wherein the displayed image routed to the second display includes the annotations and markings of the first inspector at points of the possible concealment within the items.

15. The system of claim 11, further comprising
a third x-ray security imaging unit coupled to the second networked common workstation to re-scan the items for further inspection at the secondary inspection area,
wherein a second inspector at the secondary inspection area makes annotations and markings for further analysis.

16. The system of claim 15, wherein the further analysis includes
a threat image projection library comprising aggregation, classification, and storage of images of the items re-scanned by the third x-ray security imaging unit using corresponding annotations and markings made by the second inspector.

17. The system of claim 16, further comprising
an image data stream of the airport security checkpoint to receive the images of the threat image projection library and to validate the plurality of x-ray security imaging units.

18. The system of claim 11, wherein the common format for the displayed image is made compliant with Digital Image Communication for Security.

* * * * *